United States Patent [19]

McDuffie

[11] 3,799,347

[45] Mar. 26, 1974

[54] BIDIRECTIONAL CONTAINER FOR OIL FILTER

[76] Inventor: Thomas F. McDuffie, P.O. 11926 Taylorcrest, Houston, Tex. 77024

[22] Filed: Sept. 27, 1971

[21] Appl. No.: 184,048

[52] U.S. Cl.............................. 210/134, 210/136
[51] Int. Cl............................................ B01d 27/08
[58] Field of Search ............ 210/136, 239, 240, 134

[56] References Cited
UNITED STATES PATENTS
| | | | |
|---|---|---|---|
| 3,322,281 | 5/1967 | Gulick | 210/136 X |
| 3,289,841 | 12/1966 | Quinting | 210/136 X |
| 3,472,380 | 10/1969 | Rosaen | 210/136 X |

Primary Examiner—Frank A. Spear, Jr.
Assistant Examiner—T. A. Granger
Attorney, Agent, or Firm—Donald Gunn

[57] ABSTRACT

In a first alternative embodiment, a bidirectional container for an oil filter is provided in which the container is symmetrically built with respect to both ends of a filter element and includes check valves directing the flow from the exterior of the filter element through the element and then to the central axial portion thereof. The central portion is drained from the filter through a check valve. The filter works with the flow reversed in the same manner.

An alternative embodiment is differently arranged, and functions in a similar manner.

13 Claims, 6 Drawing Figures

3,799,347

PATENTED MAR 26 1974

Thomas F. McDuffie
INVENTOR

BY  Donald Gunn
ATTORNEY

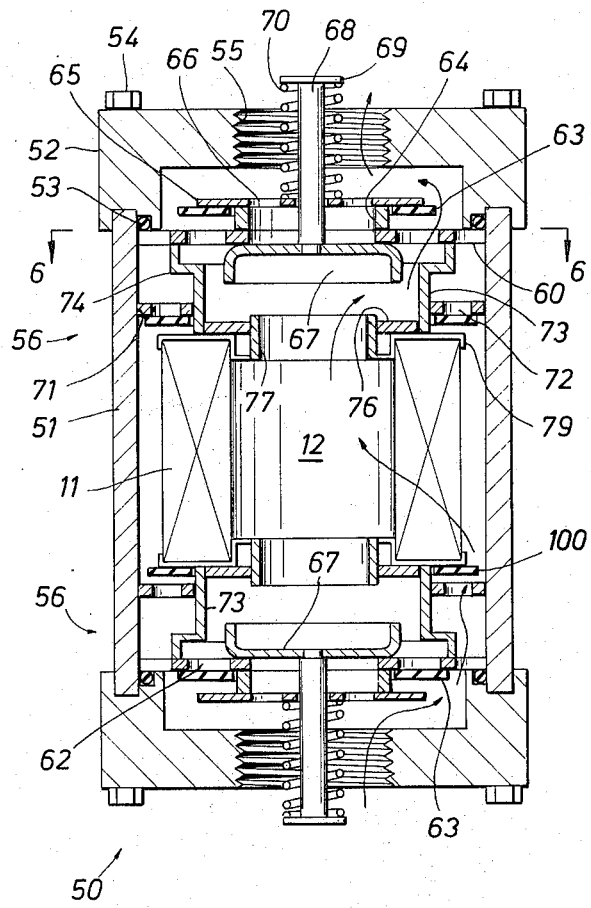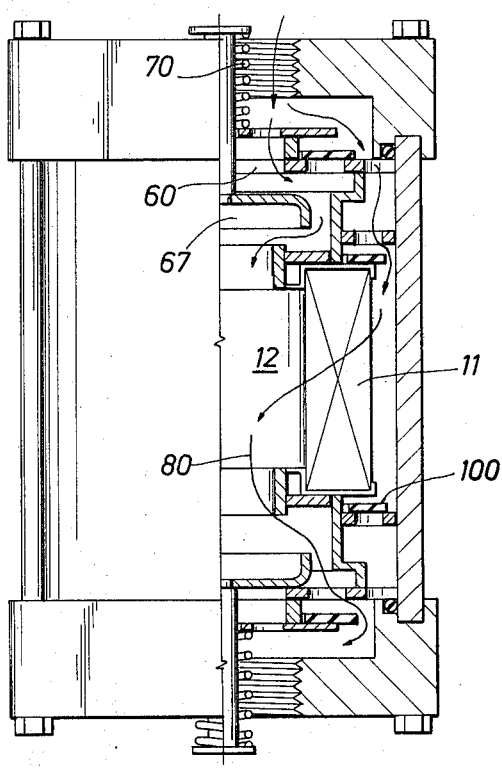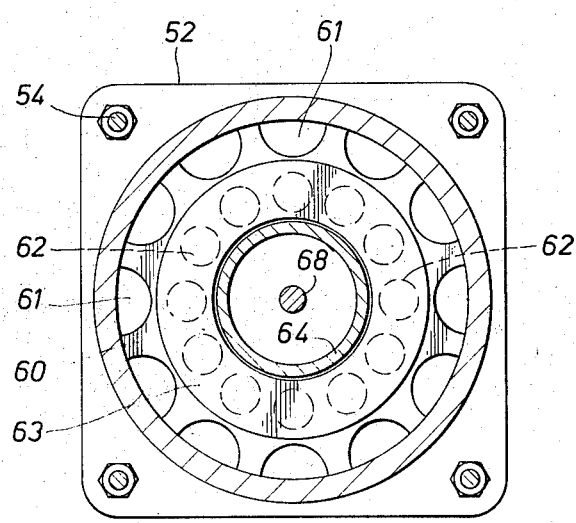

BIDIRECTIONAL CONTAINER FOR OIL FILTER

SUMMARY OF PROBLEM AND SOLUTION

In many instances, a closed hydraulic system, quite often subject to reversals of flow, is permitted to function without filtering. It is presumed and hoped that the hydraulic fluid is basically clean. If an impurity which could cause damage is trapped in the fluid, it may circulate hundreds of times through the system wearing the system continuously. Often closed hydraulic systems include high pressure pumps and fluid driven equipment such as rotary turbines, hydraulic cylinders, brake systems, and the like. In many cases, the fluid is under extremely high pressure. This further enhances the damage which can be done by impurities in the hydraulic system.

For use in hydraulic systems, the present invention provides a filtering means whereby a conventional filter cartridge can be inserted into the cannister or container of the present invention to purify the hydraulic fluid. The device works without regard to the directional flow of the hydraulic fluid. Quite often the hydraulic system may reverse its direction of flow. For example, a hydraulic pump may be connected with a hydraulic motor which is bidirectional in operation. Reversal of direction of the motor is achieved by reversing the flow through the motor. In this case, the fluid may flow first one way and then the other way in the closed hydraulic system. The filter container of the present invention is adapted to cooperate with a hydraulic system such that reversals in flow have no effect whatsoever on the device. Accordingly, the present invention is summarized as including two embodiments. The first embodiment has a canister for receiving a filter element therein and is symmetrically constructed at opposite ends. Each end is adapted to be connected in the hydraulic system, and either end may be the inlet while the remaining end serves as the outlet to return the filter fluid to the system. At both ends a passage is provided directing fluid from the openings serving as inlets and outlets to the outside of the filter element. The fluid passes through the filter element to the central axis of the element. It is then removed from the opposite end. The symmetrical construction enabling the device to function in a bidirectional manner includes a check valve located at either end for directing the flow toward the exterior. One check valve opens to drain the central portions of the filter element. The device is also provided with a pressure relief valve so that if the filter element is unduly clogged or the flow is unduly high, some of the fluid is vented by the pressure relief valve to pass directly through the filter without filtering.

In the alternative structure, a similar arrangement is provided although the details of construction are different as will be set forth hereinafter.

The following specification and drawings set forth the description of the two embodiments of the present invention, the drawings being:

FIG. 4 is a sectional view taken along the center line of an alternative embodiment illustrating details of construction and symmetry of the upper and lower portions of the device;

FIG. 5 is a sectional view similar to FIG. 4 illustrating the altered position of the components in the event of an overflow rate from the upper end to the lower end of the filter and cannister; and, FIG. 6 is a sectional view taken along the line 6 — 6 of FIG. 4 illustrating the ports and passages which conduct the fluids to the filter.

Figures 1, 2:
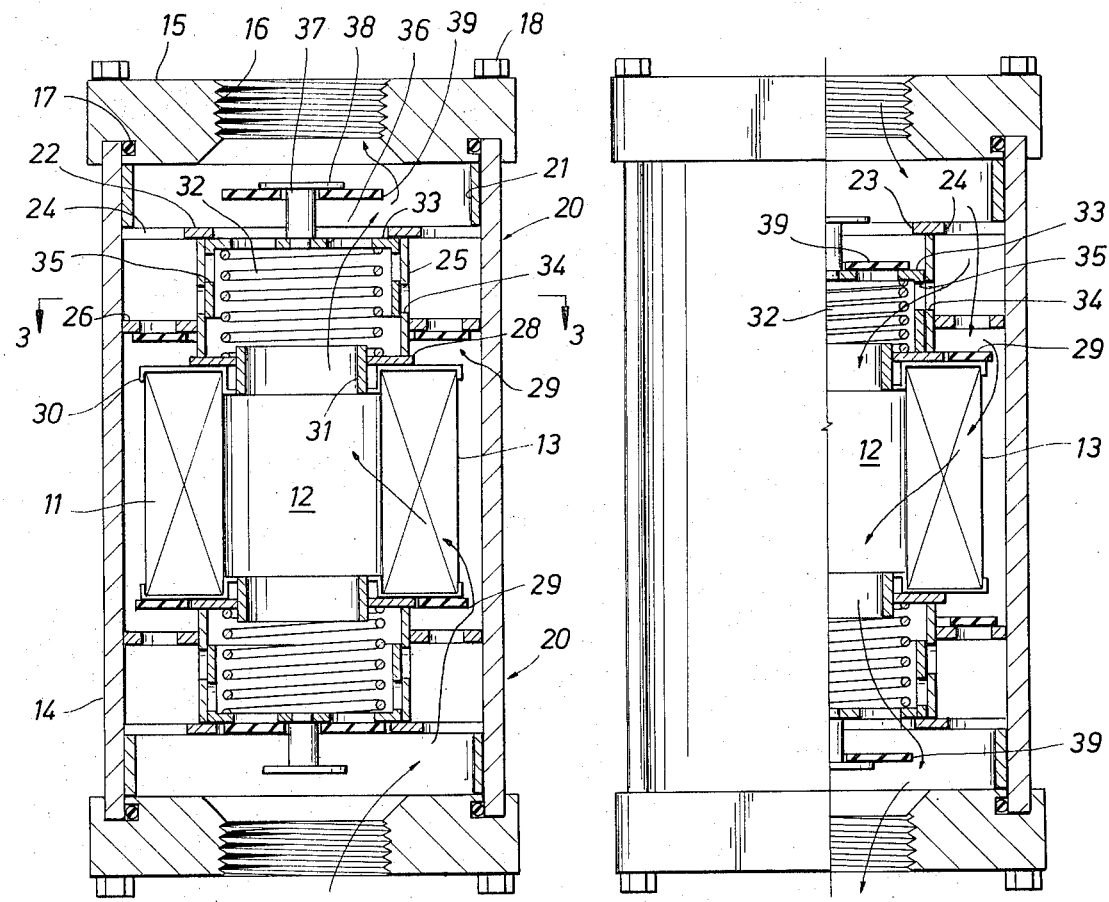
FIG. 1 is a sectional view taken along the center line of the filter cannister of the present invention illustrating the symmetry of the upper and lower portions thereof.
FIG. 2 is a view similar to FIG. 1 illustrating movement of certain components achieved on an overflow rate from the upper end to the lower end of the cannister.

In the drawings, attention is first directed to FIG. 1 which illustrates the first embodiment of the present invention. The structure of FIG. 1 is indicated generally by the numeral 10. The filter incorporates a filter element 11 which is a replaceable bought item intended to be cooperative with the device of the present invention. The filter element is typically a folded paper accordian pleat device having a central passage which is indicated by the numeral 12 in the drawings. The fluid to be filtered is introduced to the exterior or the outer surface at 13.

The outer surface and inner passage filter are noteworthy in that all filters, as a practical matter, function by conducting fluid from the exterior through the filter element and then to the interior passage. In other words, the flow is from outside to inside. This leaves the particles trapped or embedded on the outer surface of the material which comprises the filter element itself. It should be kept in mind that the apparatus of the present invention is intended for use with fluid flow in the conventional direction, from exterior to interior of the element. It is further intended for use with a conventional element, there being many sources or brands of filter elements which can be used with the device of the present invention. The structure of FIG. 1 has been slightly exaggerated to show the details of the invention while diminishing the relative size of the filter element for purposes of clarity and illustration, but is not intended as a scale drawing of the apparatus.

Returning to FIG. 1, the filter or cartridge 11 is inserted in the canister 10. The canister 10 is comprised of a metal cylinder 14 which is sealed at the upper and lower ends by identical end plates 15. Only one end plate will be identified with the numeral 15 inasmuch as the device is symmetrical about its midpoint. Accordingly, the description will be directed to the upper end of the device while the lower end will be mentioned only when the operation of the device is described.

The plate 15 has a tapped opening 16. The tapped opening is adapted to be connected in a closed hydraulic circuit. The opening 16 can be connected as either the inlet or the outlet. It may be reversed in function inasmuch as the device of the present invention is intended to function and cooperate with a hydraulic system in which the fluid flow reverses directions. The plate 15 is sealed to the cylinder 14 by means of an O-ring 17 and is pulled snugly against the cylinder 14 by stove bolts and associated nuts generally indicated at 18 which clamp the end plates 15 at both ends of the cylinder 14. The tapped opening 16 is adapted to be connected with some fitting to either supply or take away hydraulic fluid to the canister 10 of the present invention. The tapped opening 16 opens to the interior and delivers the hydraulic fluid for filtration. The interior of the canister 10 basically contains three components, the filter 11, and a pair of similar inserts generally indicated at 20. The two inserts are located at opposite ends of the filter. They are identical in construction and function in the same manner so that the direction of flow of the hydraulic fluid can be reversed with impunity. The upper insert will be first described.

The upper insert 20 has an upstanding skirt 21 which serves as a spacer to position the insert a specified distance from the end plate 15. It can be shortened or lengthened to support filters of different lengths in the can. The spacer 21 terminates at and connects with a radially outwardly extending flange plate 22. The flange plate 22 has an opening at its center which is indicated by the numeral 23 in FIG. 2. It is perforated at various points, including the cutout portion indicated at 24 in FIG. 1. The perforations are spaced about the flange plate 22 to permit the flow of fluid to pass the plate. The flange plate 22 provides supporting structure for the insert 20.

Figure 3:
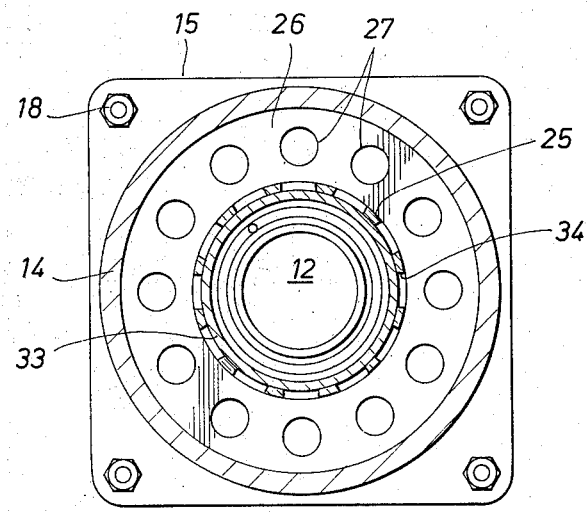
FIG. 3 is a sectional view taken along the line 3 — 3 illustrating some of the passages through the filter and cannister.

The flange plate 22 is connected to a cylindrical member 25 of reduced diameter. The cylindrical member 25 is coaxial with the canister 10. The cylindrical member 25 is aligned by and supported by an externally arranged second flange plate 26. The plate 26 is shown in greater detail in FIG. 3. The flange plate 26 is likewise provided with a number of openings 27 which are spaced about the periphery. The openings 27 provide a passage through the plate 26. The two plates 22 and 26 align the cylindrical member 25 within the canister. The lower end of the cylindrical member 25 supports and is joined to a cap mechanism 28. The cap mechanism 28 includes a downwardly facing shoulder which rests on the end plate 30 which comprises a portion of the removable filtration cartridge 11. In ordinary manufacture, the cartridge has end plates at each end which support the accordian folded paper material which comprises the body of the filter.

Returning to the structure of the canister 10 and the insert which is placed on the filter element, the cap plate 28 supports an internally located coaxial cylinder member 31. The cylinder 31 extends downwardly into the passage within the filter element 11.

The cylindrical member 31 conducts hydraulic fluid to or away from the central portions of the filter cartridge 11. In other words, it communicates with the inside of the filter as opposed to the outside 13. The cylindrical member 31 stands above the member 28 as shown in FIG. 1 and provides an encircling shoulder for a spring 32. The spring 32 is coiled within the cylindrical member 25 and bears upwardly against a movable cup-shaped member indicated by the numeral 33. The member 33 is coaxially received within and slidable adjacent to the encircling cylindrical member 25. Its upward range of movement is limited by the overhang of the flange plate 22. Its lower range of movement is limited by the stacking of the coils of the spring 32, or the skirt contacting the member 28. The members 25 and 33 are perforated at a number of openings indicated by the numerals 34 and 35 shown in FIG. 1. These openings are out of register as shown in FIG. 1. They achieve registration with one another, and hence, can be said to lie on a common plane as better shown in FIG. 2. These openings permit communication having use as will be described hereinafter. The numeral 36 of FIG. 1 identifies an additional set of openings near the top wall of the cup-shaped member 33. A stem 37 is joined to the top of the cup 33 and has an enlargement or head 38 at its upper end. The head 38 limits upward movement of a loose washer-like member 39. The member 39 serves as a check valve to control flow of hydraulic fluid through the openings 36. As shown in FIG. 1, the loose washer 39 closes these passages to flow from above toward the center axis of the filter element 11. However, flow in the opposite direction is permitted because the washer 39 is slidable on the shaft 37 as is shown at the lower portions of FIG. 2.

In operation, the device of FIG. 1 works in the following manner. It will be presumed first that fluid is introduced under extremely high pressure at the upper end of the canister and will flow out the lower end. It should be kept in mind that the means 20 is inserted at two locations in the canister. The flow is introduced through the tapped opening 16 by an appropriate connection, not shown, and is directed to the outer edges of the cylindrical canister 14. The flow passes through the outwardly extending flange plates 22 and 26. These plates are provided with openings as shown. The equivalent cross sectional area of the openings in the plates 22 and 26 is equal to or greater than the cross sectional area of the tapped opening 16. Hence, no bottleneck is formed within the filtering device of the present invention. The flow then proceeds to the vicinity of the filter element. At this juncture, it should be understood that the flow is on the outside of the filter element, not the inside. This places the unfiltered lubricant or hydraulic oil in position to be filtered upon passing through the filter element 12. In other words, the flow is conventionally from the outside to the inside of the filter element. The flow arrives at the internal passage 12 of the filter, and then moves down somewhat in the direction of the arrow 43 in FIG. 1. It flows axially and into the means 20 inserted at the lower end of the canister 10. It passes through the openings 36 in the cup-shaped member 33. It forces the washer 39 along the shaft 37 on which it is mounted and against the enlargement 38 at the remote end of the shaft. This defines a lip or gap whereby the fluid can flow to the lowermost end of the device and out the lower opening. It will be noted that this path of flow is achieved either from the upper end to the lower end or in the reverse manner. In other words, the device functions with flow from either direction such that the flow is always directed from the outside to the inside of the filtering element 11.

Occasionally, the flow rate increases beyond that which can be handled by the filtering element 11. The filter element may be neglected in its installation and eventually become so clogged with previously removed trash and particles that it does not pass the same volume of filtering fluid as when new. It may occur that the drop across the device is excessive. A by-pass valve is incorporated which tends to by-pass a portion of the flow and reduce the pressure drop. This is more desirable than attempting to force an increased volume through the filter 11 because of the possibility of damage to the filtering element. Attention is directed to FIG. 2 of the drawings for an illustration of this in operation.

In FIG. 2, the spring 32 is compressed. It is compressed by the increased pressure acting on the washer 39 which is transferred to the cup-like member 33. The cup-like member 33 is a pressure responsive piston acting against the spring 32 which moves from the extended position of FIG. 1 to the position of FIG. 2. The relief valve shown in its operative condition in FIG. 2 diverts some of the lubricant flow past the filter element. The path of diversion is through the opening 24 in the plate 22 and into the ports 34 and 35 which achieve registry as shown in FIG. 2. The registry is maintained upon increased pressure differential across the washer 39. As long as the ports are aligned, fluid flows through the port 24 and then the openings 34 and 35 to the central axis 12 of the filter. It then flows downwardly past the washer 39 in the same manner as shown in the lower portions of FIG. 1.

The valve member 29 selectively closes the openings 27 in the member 26. This is achieved at a selected end of the device so the flow is forced through the filter element cartridge 11, and this is achieved with flow in either direction and without regard to gravitational position.

Attention is next directed to FIGS. 4, 5, and 6 which show an alternative embodiment indicated by the numeral 50. The structure 50 is similar in that it uses a similar cartridge 11 for the filter element. The cartridge 11 likewise has an open axial passage 12.

The canister 50 illustrated in FIG. 4 incorporates a cylindrical housing 51 which is closed by end pieces 52. The end pieces 52 are similar to those 14 shown previously. An O-ring is found at 53 to form a seal about the structure. The end plates are pulled snug by similar stove bolt arrangements at 54.

The plate 54 includes a tapped and threaded opening 55 for connection with a conduit. The opening 55 is connected to an inlet or outlet, the canister 50 functioning with bidirectional fluid flow. The fluid is introduced on the outside of the filter element 11 and flows to the inside.

The fluid flow is achieved through the use of identical inserts which are indicated by the numeral 56 in FIG. 4. Referring to the top insert, the numeral 60 indicates a transversely extending flange member which abuts against the overhanging lip of the end plate 52. The flange member 60 is perforated at many locations as best shown in FIG. 6. A first set of perforations is found at 61. The aggregate cross sectional area of the perforations 61 all about the flange plate 60 are greater than the tapped opening 55 so as to void restricting flow of fluid through the apparatus. The second set of perforations is found at 62 as best shown in dotted line in FIG. 6. The perforations 62 are covered over by a washer 63 which is positioned to function as a check valve as will be described in detail hereinafter. The washer 63 is movable away from the flange plate 60. As shown in FIG. 4, an upstanding circular member 64 centers the washer 63. The member 64 extends upwardly to an outwardly projecting shoulder 65 which limits the travel of the washer 63. As shown at the lower end of FIG. 4, the washer 63 moves away from the flange 60 to expose the second set of openings for reasons to be set forth hereinafter.

The shoulder 65 is a portion of an internally extending disc which is perforated at 66. The perforations 66 are sufficiently large to divert a flow of hydraulic fluid from the tapped opening 55 through the passages 66 and against a check valve member 67. The check valve member 67 closes the opening located internally of the shoulder 64. The check valve 67 is forced away from the shoulder 64 by differential pressure of a selected range, such as 25 psi.

The check valve member 67 is dependent on a stem 68 which has an enlarged upper edge or shoulder 69 which receives a spring 70 against it. The spring 70 rests on the shoulder 65. The shaft 68 is movable vertically to compress the spring as shown in FIG. 5 to thereby move the check valve member 67 downwardly and away from the valve seat which is incorporated in the flange plate 60. The purpose of this will be understood hereinafter.

Hydraulic fluid is introduced through the passage or tapped opening 55 and moves outwardly through the openings 61 in the flange plate 60. A second flange plate 71 is found therebelow. The flange plate 71 has a plurality of openings at 72; selectively closed by a flat washer 100 operating as a check valve but opening to permit the fluid flow to be directed to the outside of the filter element 11. The flange plates 60 and 71 align a closed cylindrical wall 73 which extends between the flange plates. Once the fluid moves past the flange plate 60, it is on the exterior of the filter element 11 and cannot move to the interior of the passage until it moves past the filter element and is directed through the filter by the check valve 100.

The closed cylindrical wall 73 is flaired at 74 to define a volume sufficiently large for receiving the check valve 67. The fluid is permitted to flow around the check valve and into the cylindrical member 73. At the other end, the cylindrical member 73 terminates in a transversely extending piece at 76 which supports a central tubular member 77. The tubular member 77 opens into the inside of the filter element. The piece 77 extends into the filter element 11 somewhat. The member 76 and the tubular member 77 jointly abut and align the end cap 79 carried on the filter element. They center each end of the filter element and abut against it to prevent leakage past the end. They provide a seal so that fluid flow is directed through the filter element in the desired manner. They serve as a means for alignment so that the filter element is centered and supported in the desired manner.

The canister 50 should next be considered. Assume for sake of discussion that the upper end of the canister 50 is connected with a supply of hydraulic fluid to be filtered. The connection is made with the tapped opening 55 and fluid is introduced. The fluid flows toward the outer wall of the canister 51 or the container wall. It flows through the openings 61 in the first flange member 60. The fluid also flows through the opening 72 and the valve 100 in the second flange member 71. It is then on the outside of the filter element. The fluid then flows in the conventional manner through the element 11 from the outside to the inside and is received in the passage 12. The check valve 100 at the end of the filter device opposite the inlet point closes to force liquid through the filter element.

The fluid then flows through the lower insert to the exterior. This is achieved in a manner as follows. The fluid first passes through the cylindrical wall member 73 shown in the bottom portions of FIG. 4. It passes to the outside of the check valve 67, and then passes through the openings 62 in the flange member 60 to force the washer 63 open as shown at the lower portions of FIG. 4. The washer is forced against the shoulder 65.

The fluid then flows past the washer 63 and through the tapped opening 55 into the remainder of the fluid communication system.

The foregoing traces the path of the fluid through the filter. It should be emphasized that it can be from top to bottom, or from bottom to top, with impunity.

The canister 50 incorporates an overflow relief means. The overflow relief means utilizes the check valve 67. Fluid is introduced on both sides of the check valve 67. There is an insignificant pressure drop across the check valve in normal operating circumstances. However, should the filter element become clogged, or should the flow become so excessive, the check valve 67 operates to relieve some of the flow. The check valve 67 is forced into the closed position by the spring 70. However, an increase in flow acts on the outer face of the check valve 67 forcing it away from the valve seat and compressing the spring 70 as shown in FIG. 5. This then introduces fluid flow to the central passage 12 of the filter 11. As shown in FIG. 5, the fluid then bypasses the filter element and is exhausted to the outlet along the path indicated by the arrow 80.

Considering both embodiments, the similarities should be noted. In both embodiments, the filter is inserted, centered and positioned dependent on the insert's position at opposite ends of the filter. The inserts serve to direct flow from either end serving as an inlet to the outside of the filter element 11. The flow always passes through the filter element and then flows to the outlet through the central portion 12 of the filter. In both cases, the outlet flow is past a check valves including washers 29 or 100 which are forced away from a flat plate having a number of openings in it.

Both embodiments provide a pressure relief valve bypass in case of clogging of the filter. In both cases, the check valve is made responsive to a spring to enable calibration of the check valve function. While it would be possible to utilize other forms of the check valve, this is believed to be the most desirable in the customary application of the filter canister of the present invention.

Many alterations and variations can be accomplished. The inserts can be formed of single piece construction, or can be integrally molded. They may also be keyed in position or permitted to be rotated without altering the operative mechanism. They can be formed of many pieces which can be joined together. This might be the case where the device is installed in a system of extremely high pressure. The check valve 29 is flat stock, formed of metal or a resilient material. Alternatively, it can be formed of resilient material with an outer curled lip of the sort found in the valve 67. Flow against the lip is blocked, but flow from the other direction is permitted. The use of a flexible lip permits the use of a check valve washer which deflects rather than moves away from the openings 27. Similarly, the check valve 67 in FIGS. 4 and 5 can be formed of flexible material to open, and hence need not move away from the seat.

One further modification of this sort is the use of a long spring extending through the passage 12 (see FIG. 1) in lieu of the spring 32 found at two places. This changes the spring rate force acting on the valves at each end.

As an aid to following operation of the filter structure shown in alternative embodiments, the opening and closing of valves in the embodiment 10 will be listed in tabular form. The flow is given from top to bottom and then bottom to top. Since the valves are also duplicated at the top and bottom, they will be identified in the chart by the suffixes T and B to indicate location.

|     | Flow, Top to Bottom | Flow, Bottom to Top |
| --- | --- | --- |
| 29T | open | closed |
| 29B | closed | open |
| 39T | closed | open |
| 39B | open | closed |

The foregoing describes at least two embodiments of the present invention. The scope thereof is determined by the claims which are appended hereto.

What is claimed is:

1. A receptacle apparatus for use in a fluid flow system wherein fluid is to be cleaned by a filter element within the receptacle:
   a. A closed housing having a filter element receiving cavity therein;
   b. a pair of openings adapted to be connected into a fluid flow system at spaced locations of said housing for introducing and removing fluid from said housing;
   c. first means within said housing and adjacent to the filter receiving cavity therein for directing flow of fluid introduced through one of said openings toward a selected volume with respect to said cavity;
   d. a second means cooperatively arranged within said housing and functioning in a manner similar to said first means for directing fluid flow in like manner between the remaining one of said openings and said cavity;
   e. said first and second means each having an alternatively selected and operable path therethrough for conducting fluid flow from said cavity to one of the two openings in said housing;
   f. encircling check valve means within said housing and extending at least partially about and adjacent to said filter element receiving cavity and operatively associated with each of said first and second means said first and second means functioning in conjunction with said check valve means to controllably direct flow from one of said openings serving as an inlet to the selected volume of said cavity such that flow through said cavity and a suitable filter element placed therein is achieved without regard to entry of the fluid at either opening thereof, and also directing fluid flow from said cavity to the other of said openings serving as an outlet from said housing.

2. The invention of claim 1 wherein said first means comprises:
   a. a removable insert adapted to be slidably positioned within said housing;
   b. said insert having a cooperative mating surface for engaging a suitable filter element therein to position, and support such an element within said housing;
   c. there being a passage in communication with the central portions of said cavity and adapted to communicate from the axis of such a filter element;
   d. a valve seat in communication with said passage;
   e. means for mounting said check valve means in cooperative relationship to said valve seat for opening on the occurrence of fluid flow through said passage from the vicinity of said cavity and the filter element therein toward said valve seat; and, f. said insert having an outlet means on the opposite side of said valve seat from said check valve means for directing flow toward the opening in said housing nearer said insert.

3. The invention of claim 2 wherein said insert further includes a generally transversely extending flange member for aligning and positioning said insert within said housing and said flange member incorporates openings therein having a cross sectional area equal to or greater than that of the opening in said housing for introducing fluid thereto.

4. The invention of claim 3 wherein said flange member is supported on a cylindrical walled member which is closed to communication thereacross such that said closed member in cooperation with said transversely extending member directs fluid flow introduced at the opening in said housing toward the outer edge of said cavity therein.

5. The invention of claim 4 including a second generally transversely extending member having openings therein, said first and second members aligning said inserts with respect to said housing.

6. The invention of claim 1 wherein said first and second means both comprise similar structures.

7. The invention of claim 1 wherein said first means includes:
  a. a cylindrical housing;
  b. a transversely extending end plate having a centrally located opening therein, said end plate being adapted to be connected to one end of said cylindrical housing in a sealing relationship thereto;
  c. spacer means adapted to be inserted in said housing and extending a predetermined distance therealong;
  d. a transversely extending planar member positioned by said spacer means, said planar member having a plurality of openings therein near the outer periphery;
  e. a closed tubular member connected to said planar member and extending therefrom and generally concentrically arranged within said housing;
  f. a shoulder carried at the lower end of said tubular member and extending transversely of said housing, said shoulder being adapted to be contacted against and defining a plane of support for a filter element inserted in said cavity within said housing;
  g. said shoulder forming a seal cooperative with said filter element such that fluid flowing on the exterior of said tubular member is exposed to the outside of said filter element and must pass therethrough in the filtration of the fluid flow;
  h. a centrally located opening in said planar member;
  i. a flat washer received within said opening which closes same;
  j. a stem fixedly supported by said planar member and slidably receiving said washer thereon; and,
  k. a valve seat cooperative with said washer to serve as a check valve.

8. The invention of claim 7 further including:
  a. a coil spring received within said tubular member and captured therein by said shoulder at one end and a slidably movable cap means positioned within said tubular member and captured therein by said transversely extending planar member;
  b. a first set of openings in said tubular member;
  c. a second set of openings in said cap member, said first and second set of openings being arranged to provide fluid communication therethrough when pressure bears on said cap member against the spring force and moves said cap member to a position aligning the openings of said cap member and said tubular member; and,
  d. said first and second set of openings being further arranged to deny fluid communication therethrough when said spring is in its normal extended position.

9. The invention of claim 7 further including a second transversely extending planar member surrounding said tubular member cooperating with said first planar member to align said tubular member within said housing and further having a plurality of openings in the outer periphery for communicating fluid to the cavity within said housing.

10. The invention of claim 1 wherein said housing includes:
  a. a cylindrical tubular member being hollow and open at both ends;
  b. a first and second end plate adapted to join with said housing to define therein said cavity, said first and second end plates having centrally located openings therein one of which is to serve as an inlet and the other of which is to serve as an outlet;
  c. a first insert adapted to be positioned adjacent one of said end plates and comprising:
    1. a transversely extending planar member having a diameter permitting it to fit within said tubular member;
    2. openings near the outer periphery of said planar member to permit the passage of fluid flow therethrough;
    3. a closed wall tubular member supported by said planar member and having upper and lower ends;
    4. shoulder means carried on said lower end of said tubular member and defining an abutting supportive shoulder for contact against such a filter element as might be placed in said cavity of said tubular member; and,
    5. said check valve means being arranged with respect to the upper end on said tubular member to prevent entry of fluid from said opening in said end plate, said check valve means and said upper end of said tubular member cooperating to direct fluid flow introduced at the opening immediately adjacent thereto toward the outer openings in said planar member such that said fluid flow is directed to the outer side of a filter element placed within said cavity; and,
  d. a second insert similar to said first insert and cooperatively arranged at the opposite end of said cylindrical tubular member from said first insert.

11. The invention of claim 10 wherein said check valve means is mounted on a stem and a spring is received on said stem tending to urge said check valve means against said upper end.

12. The invention of claim 1 further including an encircling ring-like member adapted to be positioned in an encircling manner about a filter element within said cavity and extending toward the inner wall of said closed housing.

13. A receptacle apparatus for use in a fluid flow system wherein fluid is to be cleaned by a filter element within the receptacle;
- a closed housing having a filter element receiving cavity therein;
- a pair of openings adapted to be connected into a fluid flow system at spaced locations of said housing for introducing and removing fluid from said housing;
- first means within said housing and adjacent to said filter receiving cavity therein for directing the flow of fluid introduced through one of said openings toward a selected volume with respect to said cavity;
- a second means cooperatively arranged within said housing and functioning in a manner similar to said first means for directing fluid flow from said cavity through the remaining one of said openings serving as an outlet;
- said first and second means having an alternatively selected and operable path therethrough for conducting fluid flow from said cavity to one of the two openings in said housing; and,
- fluid by-pass means extending between said openings and rendered operative on fluid flow exceeding a predetermined level, said by-pass means diverting a portion of the fluid flow between said openings at a point upstream of said filter element receiving cavity into a by-pass fluid flow path between said openings.

* * * * *